United States Patent
Holaso et al.

(10) Patent No.: US 10,222,767 B2
(45) Date of Patent: Mar. 5, 2019

(54) HVAC INFORMATION DISPLAY SYSTEM

(71) Applicant: Honeywell International Inc., Morristown, NJ (US)

(72) Inventors: Albert Holaso, Celebration, FL (US); Stuart Donaldson, Kirkland, WA (US); Kevin Callahan, Seattle, WA (US)

(73) Assignee: Honeywell International Inc., Morris Plains, NJ (US)

( * ) Notice: Subject to any disclaimer, the term of this patent is extended or adjusted under 35 U.S.C. 154(b) by 585 days.

(21) Appl. No.: 14/482,607

(22) Filed: Sep. 10, 2014

(65) Prior Publication Data

US 2016/0069584 A1 Mar. 10, 2016

(51) Int. Cl.
| | |
|---|---|
| *F24F 11/00* | (2018.01) |
| *G05B 15/02* | (2006.01) |
| *F24F 11/30* | (2018.01) |
| *F24F 11/52* | (2018.01) |

(52) U.S. Cl.
CPC ............. *G05B 15/02* (2013.01); *F24F 11/30* (2018.01); *F24F 11/52* (2018.01); *G05B 2219/2614* (2013.01); *G05B 2219/2642* (2013.01)

(58) Field of Classification Search
CPC .......... F24F 11/0086; F24F 2011/0091; G05B 15/02; G05B 2219/2642; G05B 2219/2614
See application file for complete search history.

(56) References Cited

U.S. PATENT DOCUMENTS

| | | | | |
|---|---|---|---|---|
| 7,295,116 | B2 | 11/2007 | Kumar et al. | |
| 7,702,421 | B2* | 4/2010 | Sullivan | F24F 11/0009 236/51 |
| 7,963,454 | B2* | 6/2011 | Sullivan | G05B 15/02 236/51 |
| 8,078,326 | B2* | 12/2011 | Harrod | F24F 11/0009 62/77 |
| 8,099,178 | B2 | 1/2012 | Mairs et al. | |
| 8,151,280 | B2 | 4/2012 | Sather et al. | |
| 8,176,095 | B2 | 5/2012 | Murray et al. | |

(Continued)

FOREIGN PATENT DOCUMENTS

| | | |
|---|---|---|
| WO | WO 2009/012319 | 1/2009 |
| WO | WO 2013/062725 | 5/2013 |

OTHER PUBLICATIONS

"4.0 Today's Activities, The Home Dashboard," CRBM info@hand website, 46 pages, prior to Apr. 25, 2013.

(Continued)

*Primary Examiner* — Charles R Kasenge
(74) *Attorney, Agent, or Firm* — Seager, Tufte & Wickhem LLP

(57) ABSTRACT

A system and approach for providing information about a heating, ventilation and air conditioning system. A screen of the system on a display may have a portion revealing a perspective with a view of components such as cooling and heating coils, fans, dampers, sensors, and so forth. Data modules may be shown proximate to the components on the screen and indicate certain parameters about them. As second portion of the screen may show control and information modules related to items such as temperature and pressure control, and operating mode. The screen may also reveal relationships among sub-systems, applications, zones, alarms, and other items.

17 Claims, 18 Drawing Sheets

(56) References Cited

U.S. PATENT DOCUMENTS

| | | | |
|---|---|---|---|
| 8,196,185 B2* | 6/2012 | Geadelmann | G05B 15/02 236/51 |
| 8,219,660 B2 | 7/2012 | McCoy et al. | |
| 8,239,922 B2* | 8/2012 | Sullivan | F24F 11/0009 236/51 |
| 8,271,941 B2 | 9/2012 | Zhang et al. | |
| 8,302,020 B2 | 10/2012 | Louch et al. | |
| 8,375,118 B2 | 2/2013 | Hao et al. | |
| 8,396,887 B2* | 3/2013 | Kang | G06Q 10/06 707/769 |
| 8,516,016 B2 | 8/2013 | Park et al. | |
| 8,869,027 B2 | 10/2014 | Louch et al. | |
| 9,026,409 B2* | 5/2015 | Schmidtke | G05B 19/4093 700/100 |
| 9,134,715 B2* | 9/2015 | Geadelmann | G05B 15/02 |
| 9,152,153 B2* | 10/2015 | Sullivan | F24F 11/006 |
| 9,194,601 B2* | 11/2015 | Kuroiwa | F24F 11/0086 |
| 2005/0119767 A1 | 6/2005 | Kiwimagi et al. | |
| 2008/0185450 A1* | 8/2008 | Kwon | F24F 11/006 236/51 |
| 2008/0222565 A1 | 9/2008 | Taylor et al. | |
| 2009/0057424 A1* | 3/2009 | Sullivan | F24F 11/0009 236/51 |
| 2009/0057425 A1* | 3/2009 | Sullivan | F24F 11/0009 236/51 |
| 2009/0057426 A1* | 3/2009 | Sullivan | F24F 11/006 236/51 |
| 2009/0057427 A1* | 3/2009 | Geadelmann | G05B 15/02 236/51 |
| 2009/0057428 A1* | 3/2009 | Geadelmann | G05B 15/02 236/51 |
| 2009/0062964 A1* | 3/2009 | Sullivan | G05B 15/02 700/276 |
| 2009/0076779 A1* | 3/2009 | Simmons | B60H 1/00642 703/1 |
| 2009/0307255 A1* | 12/2009 | Park | G06Q 10/10 |
| 2009/0322782 A1 | 12/2009 | Kimchi et al. | |
| 2010/0058248 A1 | 3/2010 | Park | |
| 2010/0076605 A1* | 3/2010 | Harrod | G05D 23/1905 700/276 |
| 2010/0286937 A1 | 11/2010 | Hedley et al. | |
| 2010/0318200 A1 | 12/2010 | Foslien et al. | |
| 2010/0318329 A1* | 12/2010 | Uraki | G06F 17/50 703/1 |
| 2011/0087988 A1 | 4/2011 | Ray et al. | |
| 2011/0088000 A1* | 4/2011 | Mackay | G06T 19/00 715/853 |
| 2011/0307100 A1* | 12/2011 | Schmidtke | G05B 19/4093 700/276 |
| 2012/0039503 A1* | 2/2012 | Chen | G06T 19/00 382/100 |
| 2012/0221956 A1* | 8/2012 | Geadelmann | G05B 15/02 715/736 |
| 2012/0259466 A1 | 10/2012 | Ray et al. | |
| 2012/0291068 A1 | 11/2012 | Khushoo et al. | |
| 2013/0131872 A1* | 5/2013 | Kuroiwa | F24F 11/0086 700/276 |
| 2013/0289774 A1 | 10/2013 | Day et al. | |
| 2014/0137020 A1* | 5/2014 | Sharma | G06F 3/0486 715/769 |

OTHER PUBLICATIONS

"Free Facilities Dashboards," eSight Energy Website, 2 pages, prior to Apr. 25, 2013.
Alerton Building Controls, Gallery Prints, 7 pages, Dec. 19, 2013.
Carter, "Industrial Energy Management Dashboards Require a Toolkit," Cross Automation, 11 pages, Nov. 4, 2013.
U.S. Appl. No. 14/109,496, filed Dec. 17, 2013.
U.S. Appl. No. 14/163,850, filed Jan. 24, 2014.
U.S. Appl. No. 14/169,071, filed Jan. 30, 2014.
U.S. Appl. No. 14/169,083, filed Jan. 30, 2014.
U.S. Appl. No. 14/461,188, filed Aug. 15, 2014.
e-homecontrols.com, "e-Home Controls Website," link to actual website no longer works, 1 page, prior to Dec. 19, 2013.
http://www.ccbac.com, "C&C (/)—Omniboard," 5 pages, Dec. 19, 2013.
http://www.domcontroller.com/en/, "DomController Home Automation Software—Control Anything from Anywhere," 11 pages, printed Jan. 6, 2015.
http://www.novar.com/ems-bas/opus-building-automation-system, "Novar OPUS BAS," 1 page, prior to Feb. 13, 2013.
Instituto Superior Tecnico, "A 3D Interactive Environment for Automated Building Control," Master's Dissertation, 120 pages, Nov. 2012.
Panduit Corp., "Enable a Building Automation with Panduit Enterprise Solutions," 4 pages, Nov. 2012.
Preuveneers et al., "Intelligent Widgets for Intuitive Interaction and Coordination in Smart Home Environments," IEEE Proceedings of Eighth International Conference on Intelligent Environments, pp. 157-164, 2012.
Wu et al., "A Web 2.0-Based Scientific Application Framework," 7 pages, prior to Jan. 30, 2014.
www.geappliances.com/home-energy-manager/about-energy-monitors.htm, "Energy Monitor, Home Energy Monitors, GE Nucleus," 2 pages, printed Jan. 15, 2013.
www.luciddesigngroup.comnetwork/apps.php#homepage, "Lucid Building Dashboard Network—Apps," 9 pages, printed Jan. 15, 2013.

\* cited by examiner

Fig. 17

The Bacteria Laboratory
room temperature is at

92° F

~155

Auto-adjusting to 53° F in 30 sec

Fig. 21

System Activity

2:53:00 pm Global Controller is OFFLINE
2:58:45 pm Lab 2A shutting down
2:58:45 pm Lab 2A backup battery
  initializing operations
3:15:28 pm Facility Tech J.Jimenez
  acknowledges Lab 2A alarm
3:48:11 pm Facility Tech J.Jimenez
  creates trouble ticket
4:12:13 pm Alarm recipients notified

~162

US 10,222,767 B2

HVAC INFORMATION DISPLAY SYSTEM

BACKGROUND

The present disclosure pertains to displays, and particularly to those of heating, ventilation and air conditioning systems.

SUMMARY

The disclosure reveals a system and approach for providing information about a heating, ventilation and air conditioning system. A screen of the system on a display may have a portion revealing a perspective with a view of components such as cooling and heating coils, fans, dampers, sensors, and so forth. Data modules may be shown proximate to the components on the screen and indicate certain parameters about them. As second portion of the screen may show control modules and information modules related to items such as temperature and pressure control and specs, and operating specs and control. The screen may also reveal relationships among sub-systems, applications, zones, alarms, and other items.

BRIEF DESCRIPTION OF THE DRAWING

FIG. 17 is a diagram of a screen revealing space with a temperature too high for the monitored space;

FIG. 21 is a diagram of screen indicating activity of the temperature monitoring system relative to the space of concern, and personnel notifications and actions.

DESCRIPTION

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

The present graphical user interfaces may be used for the next generation building automation software. An ornamental design for display screens or portion thereof with animated graphical user interface may be shown. There may be a module carousel for building control equipment display.

A modular information approach may be provided. A standard building graphic display may be information designed to deliver consumable items (e.g., groups) of data related to the equipment or system display. The items may be modular and be removed or added to piece by piece depending on category, technology, or any other functional grouping.

Dashboard and tile system for a software interface may be considered. There may be software design elements for changing between applications. There may be smart tiles for feature navigation.

Each smart tile may pull summary information to the user so that it can significantly reduce work effort and information gathering.

A dashboard may be a matrix of smart tiles that allows a user to view the health of a building controls system at a glance and allow a user a quick shortcut to delve into details of any particular area quickly.

Figure 1:
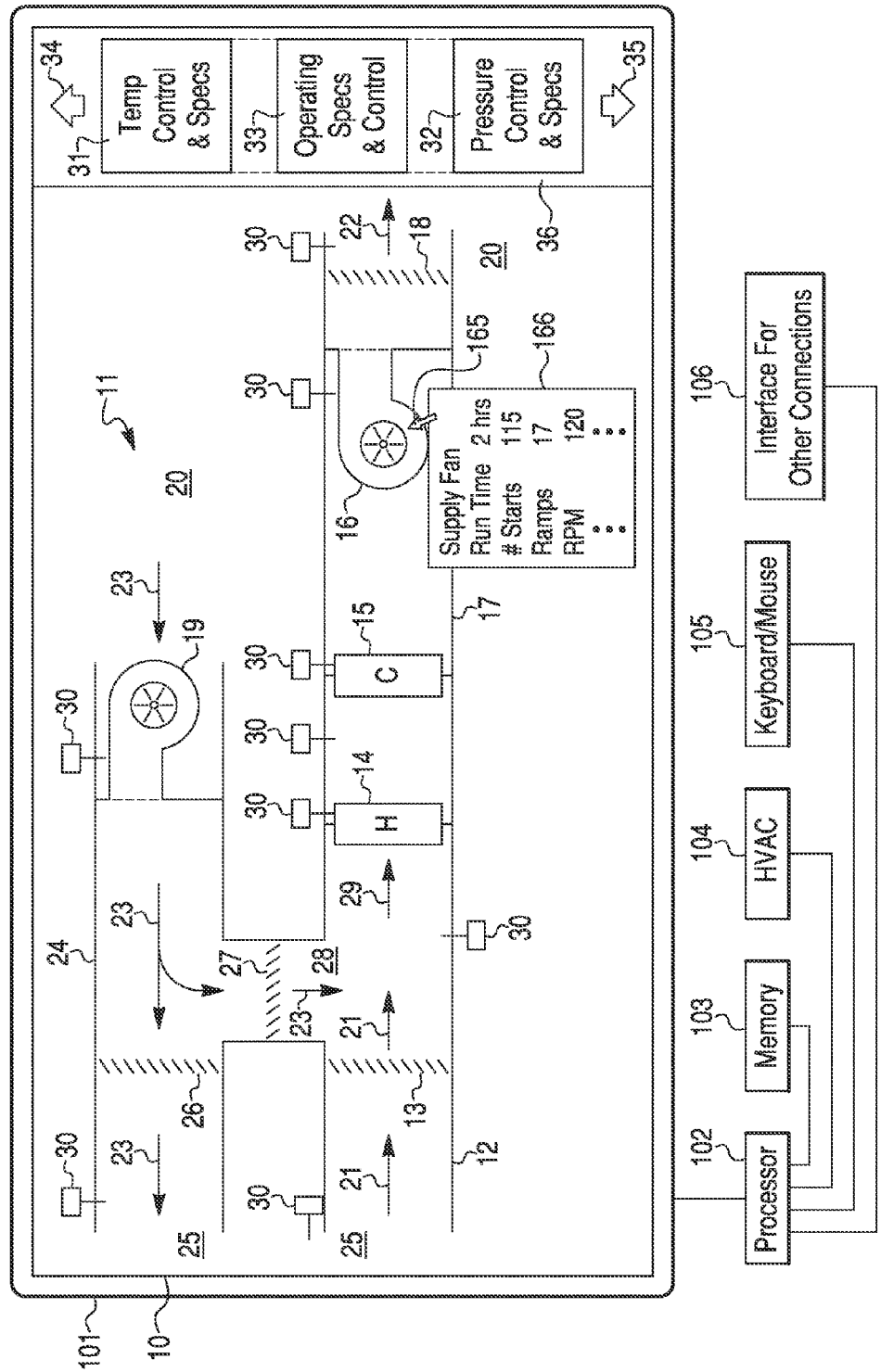
FIG. 1 is a diagram of a screen with a cutaway view showing a perspective of a heating, ventilation and air conditioning system, and data portions proximate to the perspective.

FIG. 1 is a diagram of a display 101 showing a graphic screen 10 with a cutaway view showing a perspective of a heating, ventilation and air conditioning (HVAC) system 11, and data sensors and control components 30 proximate to and indicating data and parameter information of components shown in the perspective on screen 10.

A cursor 165 may be moved around on screen 10. For instance, one may right-click or mouse-over on a component, such as a heating coil 14, damper 27, fan 16, and so forth, to get a pop-up tool-tip like an information card 166. For example, cursor 165 may be placed with a mouse on fan 16 to get a pop-up like information card 166 providing critical information about the fan to a user, such as runtime, number of starts, running amperes, and so on. The data presented may be defined an application profile for the associated piece of equipment depicted by a graphical element.

Outside air 21 from outside 25 may be drawn in at a duct 12 through a damper 13, a heating coil 14 and a cooling coil 15 by a supply fan 16. Supply fan 16 may provide supply air 22 through a duct 17 and a damper 18 into a space 20 which is to be heated or cooled and ventilated with circulation of air. Return air 23 may be drawn from space 20 by a return air fan 19 into a duct 24. Some return air 23 may exhausted out to outside 25 via a damper 26. Some return air 23 may go through a damper 27 to a mixing space 28 where air 23 can be mixed with some outside air 21 to result in mixed air 29 which is drawn through coils 14 and 15 to become supply air 22. The amount of return air 23 exhausted, the amount of outside air 21 brought in, and a mixture of return air 23 and outside air 21 to become mixed air 29 are at least partially controlled by dampers 13, 26 and 27. The amounts and mixtures of the air may also be controlled in part by supply fan 16 and return fan 19. A temperature of supply air may be controlled at least in part by coils 14 and 15 which can be controlled by heating and cooling valves, respectively. The mixed air 29 temperature may be controlled at least in part by dampers 13, 26 and 27. The pressure of the air in space 20 may be controlled at least in part by a combination of dampers 13, 26 and 27, and fans 16 and 19.

Screen 10 of FIG. 1 may incorporate control and information modules in a carousel 36 such as temperature control and specs 31, pressure control and specs 32 and operating specs and control 33. Other examples of the modules relating to system 11 may be incorporated in screen 10. Arrows 34 and 35 may allow a user to scroll through other modules (not presently shown) related to system 11.

Screen 10 may also incorporate a portion (not shown), entitled relationships that list systems, such as a boiler and chiller, application profiles, such as a standard VAV, office scheduler, conference scheduler, and so on. The portion may also list zones, such as interior zones, perimeter zones, zones in alarm, and so on. An alarm history for today, the last 7 days, last 30 days, and so on, may be listed in the portion. Screen 10 may incorporate more or fewer portions.

Screen 10 may be shown on a display 101. Display 101 may be connected to a processor 102. A memory 103 may be connected to processor 102. Processor 102 may be connected to HVAC 104. Connections to processor 102 may include components 30 including sensors, actuators, and the like of HVAC 104. A keyboard/mouse 105 may be connected to processor 102. Display 101 and keyboard/mouse 105 may constitute at least a portion for the user interface for processor 102. Processor 102 may be connected to an interface 106 for other connections such as the internet, a building automation system, and so forth.

The software engine driving display 101 may be directly linked to an application profile that is a grouping of data and/or algorithms with a specific focus. For example, the focus may be around set points, or space temperatures, or security.

The information structure of screen 10 may be compatible with a drop-in app system. When a new feature drop-in is added to an existing running system, it may have an associated information display module that will be automatically available to view in a carousel 36. Users may be able to pick and choose what data modules to include in the carousel display system. The data modules may require no configuration out-of-the-box because virtually all data are culled from the application profile. Essentially, the data are dynamically pre-configured. The data modules may be equipment and device agnostic in that the modules may work with any equipment and devices because what appears to matter is the data type and data purpose. Data type and data purpose may drive the information displayed in the data modules.

Figure 2:
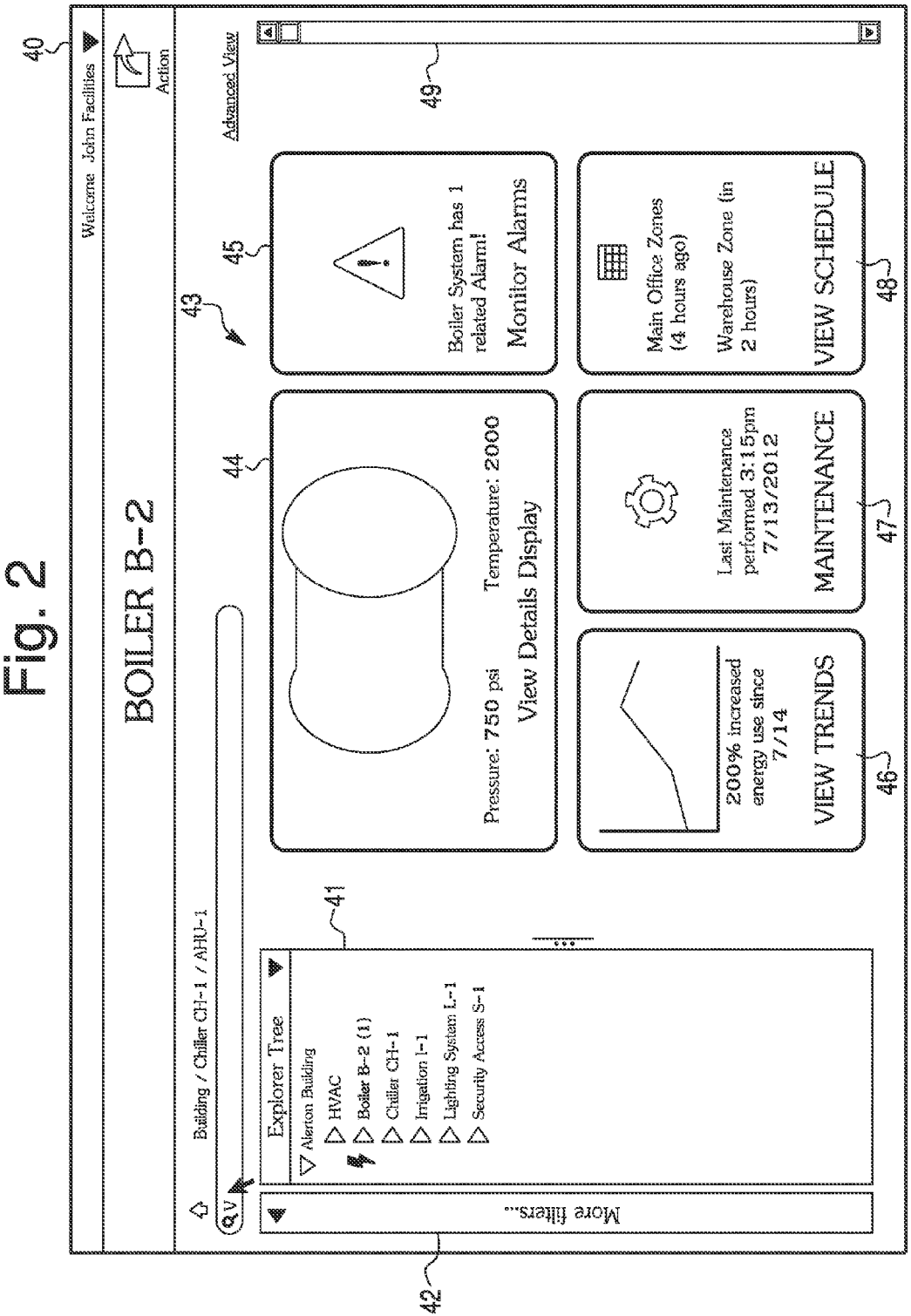
FIG. 2 is a diagram of a screen that may reveal details of equipment in a building as indicated by an explorer tree.

FIG. 2 is a diagram of a screen 40 that may reveal details of equipment in a building as indicated by an explorer tree 41. More filters may be available by pressing a bar 42. Explorer tree 41 may indicate a building and a list of equipment in the building such as an HVAC, Boiler B-2(1) Chiller CH-1, Irrigation I-1, Lighting System L-1 and Security Access S-1. Boiler B-2 may be selected resulting in an information and data portion 43 of screen 40. Examples of information and data may be shown in sub-portions 44, 45, 46, 47 and 48. More information and data about Boiler B-2 may obtained by scrolling shown or up on the screen with a bar 49.

Sub-portion 44 may be a details display with a diagram representing the selected equipment and including some data such as pressure and temperature of the equipment such as the boiler. Sub-portion 45 may indicate monitored alarms. Sub-portion 46 may indicate trends such as that of an increase in energy over time. Trends may be available for many equipment selections. Sub-portion 47 may reveal a record of previous maintenance. The maintenance sub-portion may be function for single or multiple selections. Sub-portion 48 may reveal a schedule of zones. Sub-portion 48 may provide summary information of current events and upcoming events. This sub-portion, like easy button data displays, may be configurable. Other sub-portions may be viewed with a movement of bar 49, such as a sub-portion which indicates tenant bill information. This may be an administrative action that is not necessarily attached to any selected node. Visual treatments may be considered for global and administrative type of functions.

Figure 3:
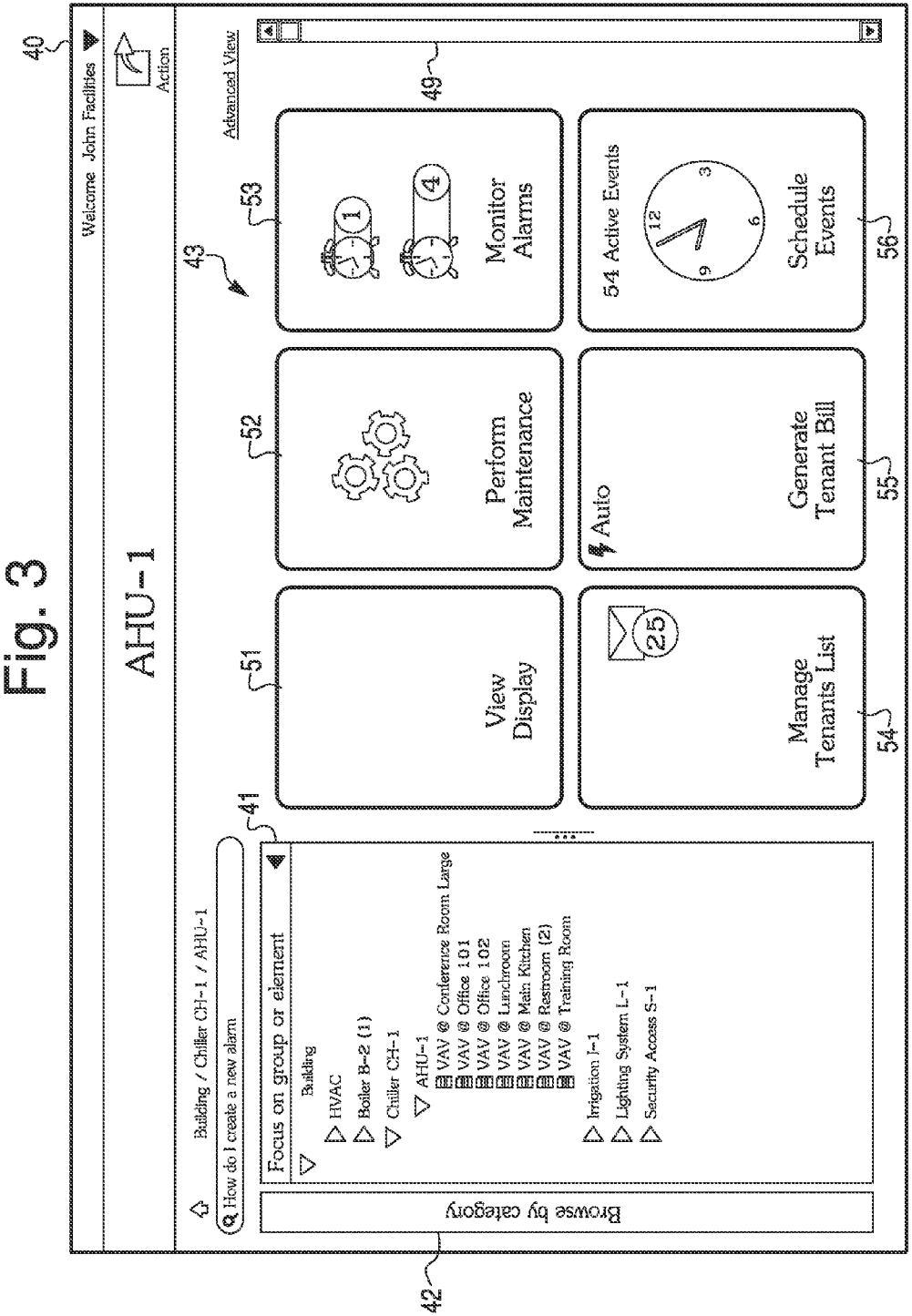
FIG. 3 is a diagram of a screen with an air handling unit selected from explorer tree, resulting in an information and data portion.

FIG. 3, like FIG. 2, is a diagram of screen 40 with an AHU-1 selected from explorer tree 41, resulting in an information and data portion 43. Instead of selecting the boiler of the building, a chiller CH-1 may be selected, and within the chiller, the air handling unit AHU-1 may be selected resulting in pertinent sub-portions in portion 43 of screen 40. VAV's for various rooms may be listed under the selected AHU. A focus may be on a group or element in tree 41.

Sub-portion 51 may display a room layout of an area covered by the AHU and its VAV's. Sub-portion 52 may indicate a perform maintenance reminder. Sub-portion 53 may indicate monitoring of certain alarms. Sub-portion 54 may indicate management of a tenants' list and sub-portion 55 may indicate generation of tenants' bills. Event scheduling may be shown with sub-portion 56. Bar 49 of screen 40 may be scrolled to view other sub-portions for the AHU.

Figure 4:
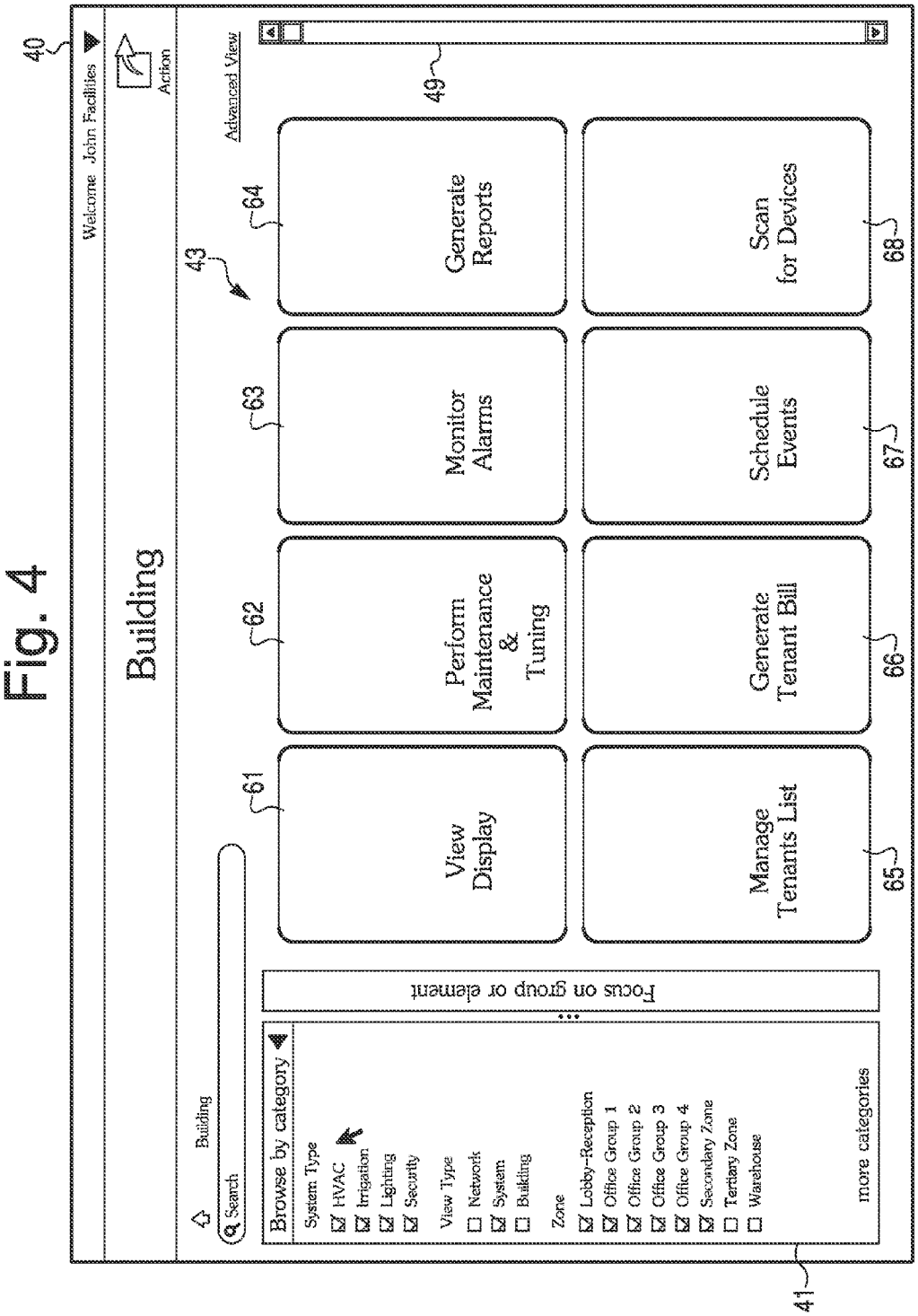
FIG. 4 is a diagram that includes a navigation tree for browsing by category, and covering a building.

FIG. 4 is a diagram that includes a navigation tree 41 for browsing by category, and covering a building. Categories may incorporate, for instance, a network, system and building as a viewing type. Examples of sub-portions 61-68 for the building may incorporate view display, perform maintenance and tuning, monitor alarms, generate reports, manage tenants' lists, generate tenants' bills, schedule events, and scan for devices, respectively.

Figure 5:
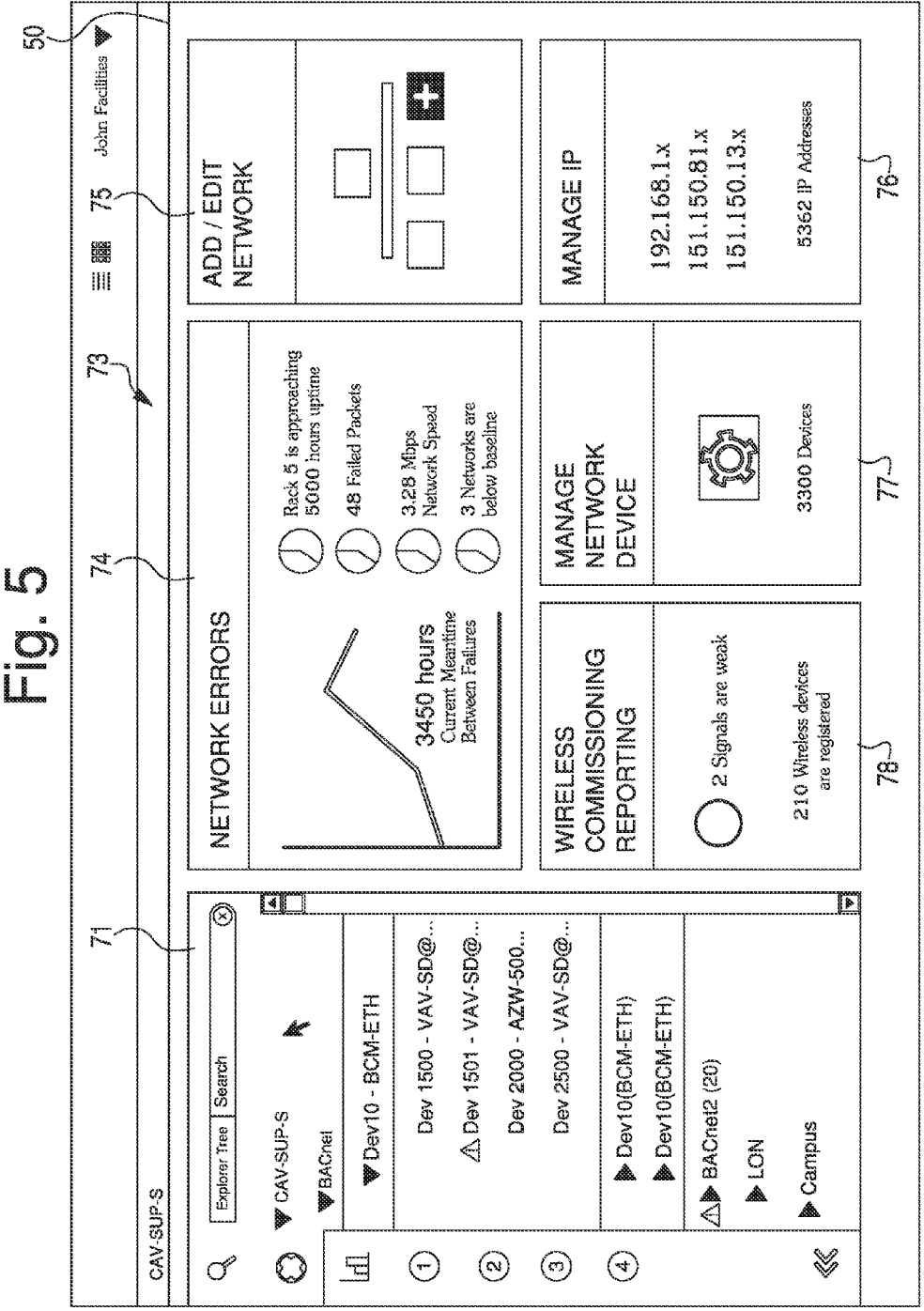
FIG. 5 is a diagram of a screen with tiled information such as sub-portions that make up a portion.

FIG. 5 is a diagram of a screen 50 with tiled information as sub-portions 74-78 that make up a portion 73. An explorer tree 71 may fill in another portion of screen 50. Network errors sub-portion 74 may show a current meantime (e.g., 3450 hours) between failures. More specific information in sub-portion 74 may incorporate examples of information such as a rack 5 is approaching 5000 hours of uptime, there are 48 failed packets, the network speed is 3.28 Mbps, and 3 networks are below baseline. Sub-portion 75 may show a diagram of add/edit network information. Managing IP (internet protocol) such as 5362 IP addresses with a listing of the addresses may be shown in sub-portion 76. Managing network devices, such as 3300 devices, may be indicated in sub-portion 77. Reporting wireless commissioning in sub-portion 78 may, for instance, reveal 2 weak signals among 210 registered wireless devices. Many other examples of tiled information may be revealed.

Smart buttons may be embedded in various screen types, such as embedded as secondary information on a graphic display. Smart buttons may be positioned, resized, and so on. A smart button may support multiple data display types. Examples may incorporate text displays, charts, graphs, image states, and animation.

Figure 6:
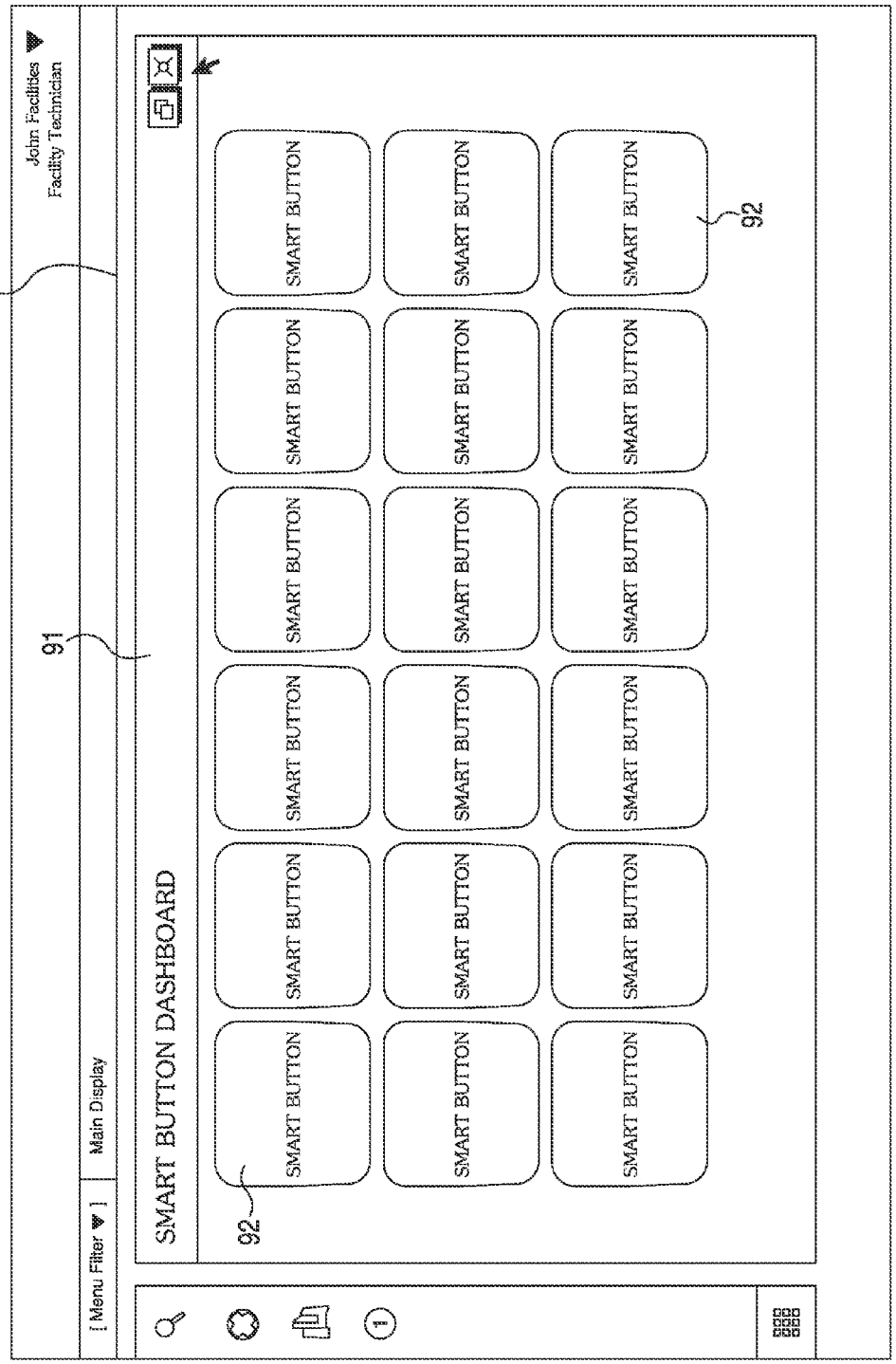
FIG. 6 is a diagram of a screen showing a dashboard that may incorporate an array of smart buttons.

FIG. 6 is a diagram of a screen 90 showing a dashboard 91 that may incorporate an array of smart buttons 92. The user interface visual specifications for the smart button itself may be a feature. Having multiple user interface states may be a common approach. The actual visual state specifications may change from the FIG. 6 but there may always be visual states.

What makes the smart button/tile different is the delivery of deep real-time content. The smart button may behave like a standard button "with" an additional ability to display deep system content. The content display on the smart button is itself not necessarily interactive but it is dynamic and real time.

One example may be a smart button for an energy log screen. The smart button for an energy log screen may contain dynamic real-time summary information of the energy log. This information may be in the form of a mini-graphic chart or a simple textual display. The actual display may be customizable and configurable and subject to any graphic design. When the smart button is pressed, the user may be navigated to the actual energy log screen. The beauty of the smart button is that it may lay the foundation for a dynamic real-time dashboard. When multiple smart buttons are laid out on the screen, the user may effectively get a dashboard that allows the user to view the health of a building controls system (or any system) by exposing customizable, relevant, and targeted real-time data.

Figure 7:
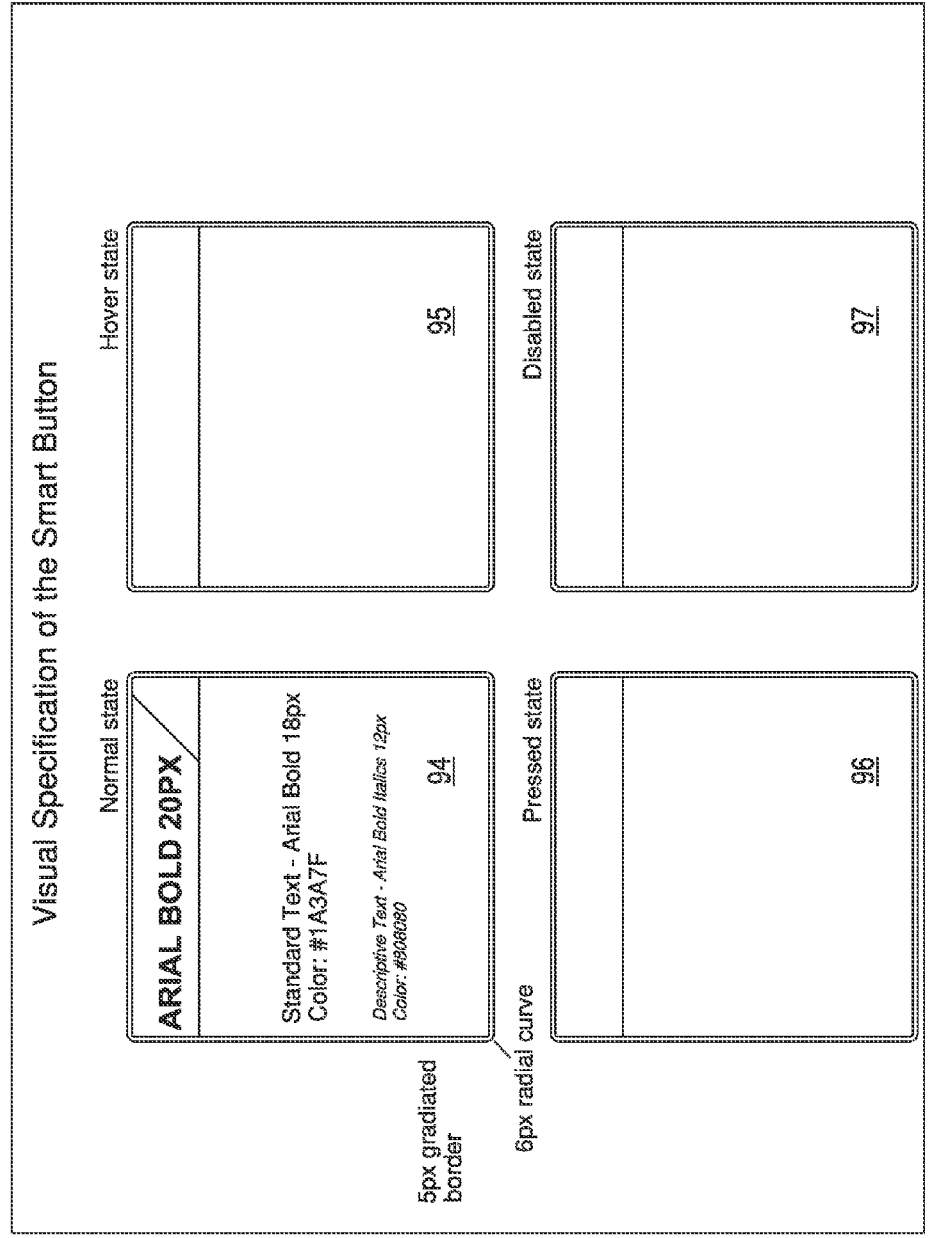
FIG. 7 is a diagram of a visual specification of a smart button.

FIG. 7 is a diagram of a visual specification of a smart button. The specification may incorporate the font and design of appearance for the smart button. Four states of the smart button may be represented by a symbol 94 for a normal state, a symbol 95 for a hover state, a symbol 96 for a pressed state, and a symbol 97 for a disabled state.

Figure 8:
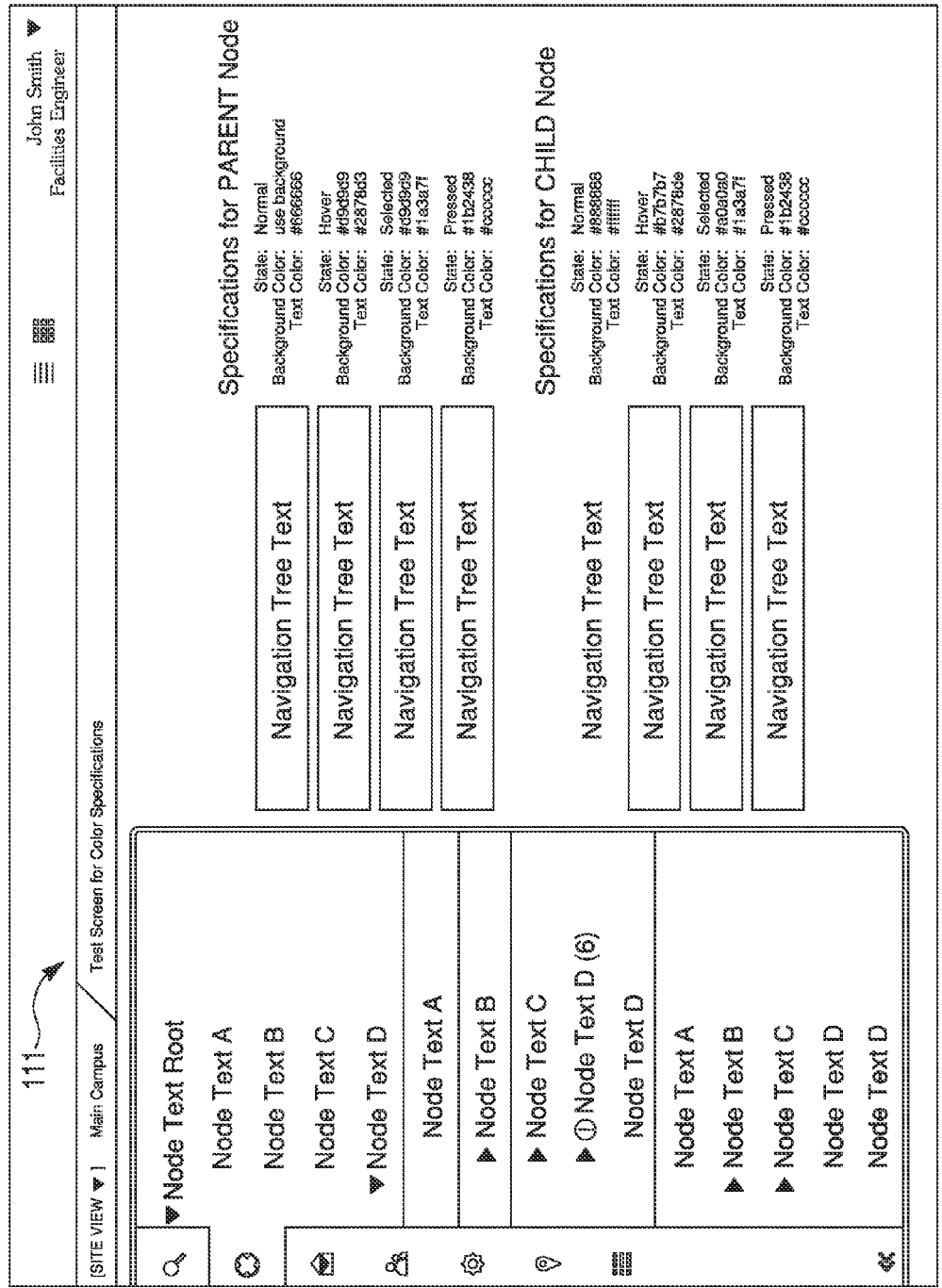
FIG. 8 is a diagram of a screen for specifications.

FIG. 8 is a diagram of a test screen 111 for color specifications, and specifications for parent and child nodes.

Figure 9:
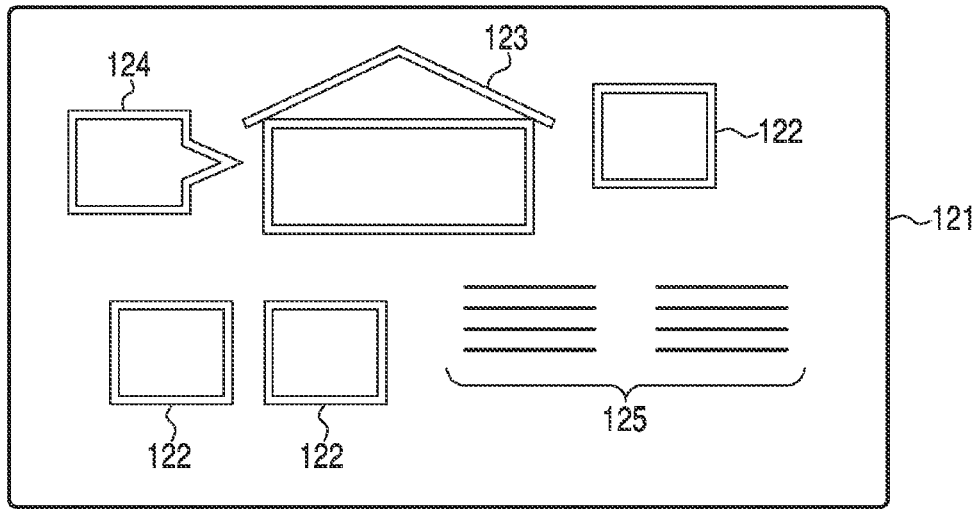
FIGS. 9-14 are diagrams of various smart button features that may be embedded in different building control display screens.

FIGS. 9-14 are diagrams of various smart button features that may be embedded in different building control display screens. FIG. 9 is a diagram of a screen 121 of smart buttons 122 and an image 123 of a structure such as that of a home. Information in a box 124 may relate to image 123. Text 125 may relate to smart buttons 122, image 123, or other items. Screen 121 may be customized or generated.

Figure 10:
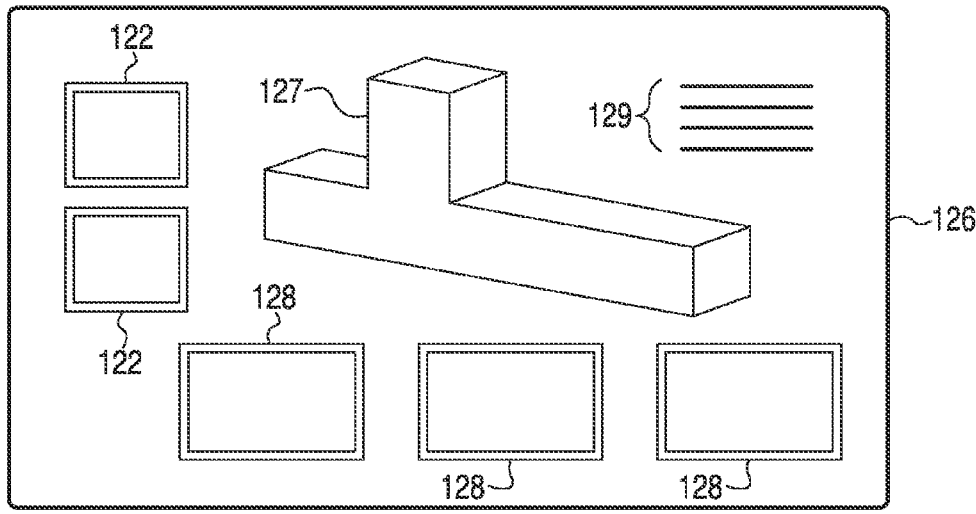

FIG. 10 is a diagram of a screen 126 having smart buttons. There may be an image 127 with a perspective view of a structure such as an HVAC. Text 129 may relate to structure 127. Blocks 128 may be images or text relating to structure 127 or other items. Screen 126 may be a graphic display with or without Omni graphics.

Figure 11:
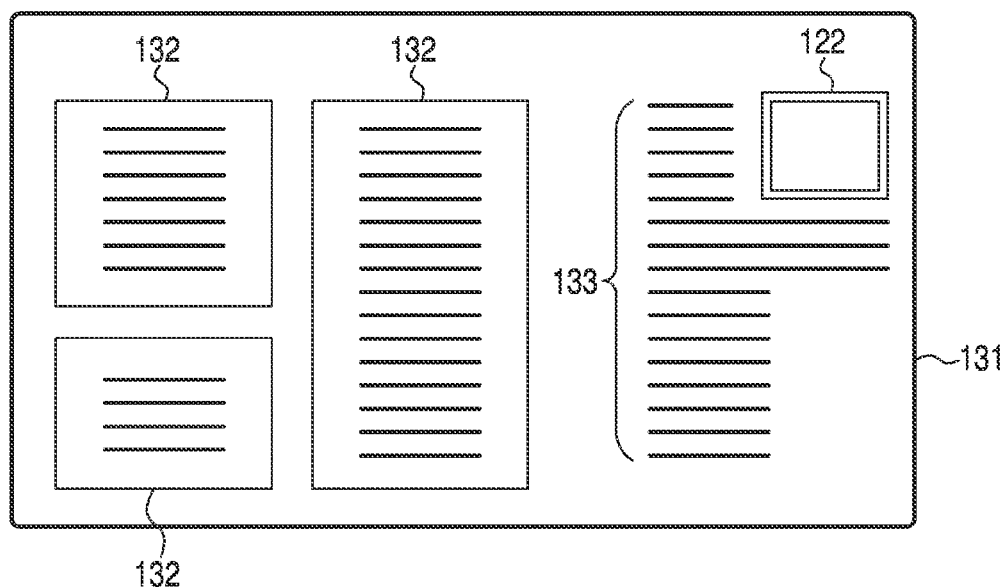

FIG. 11 is a diagram of a screen 131 of properties. The screen may be dynamically generated. A smart button 122 may be used to generate blocks 132 of text and/or images. Other information 133 may appear on screen 131.

Figure 12:
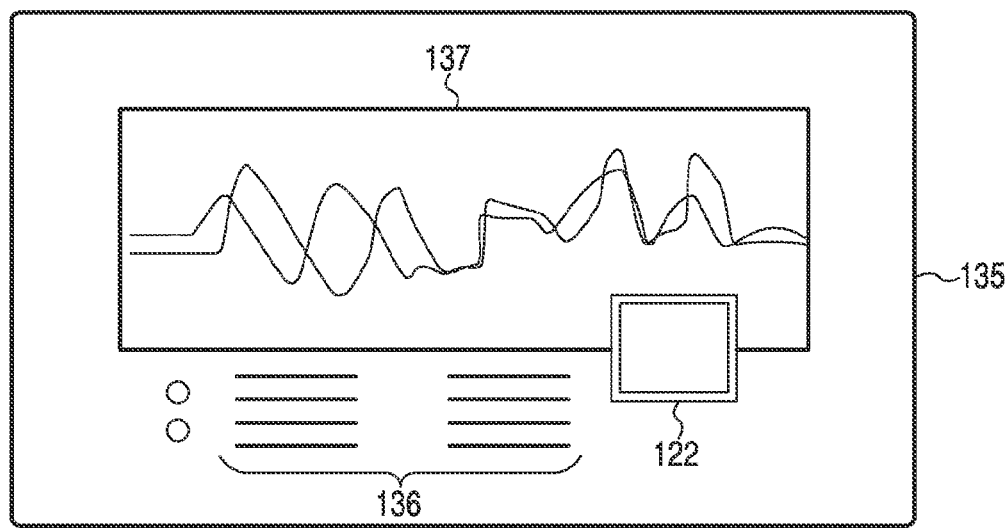

FIG. 12 is a diagram of a screen 135 with a smart button. There may be data or information 136. A data viewer 137 via charts may provide a representation of data or information 136.

Figure 13:
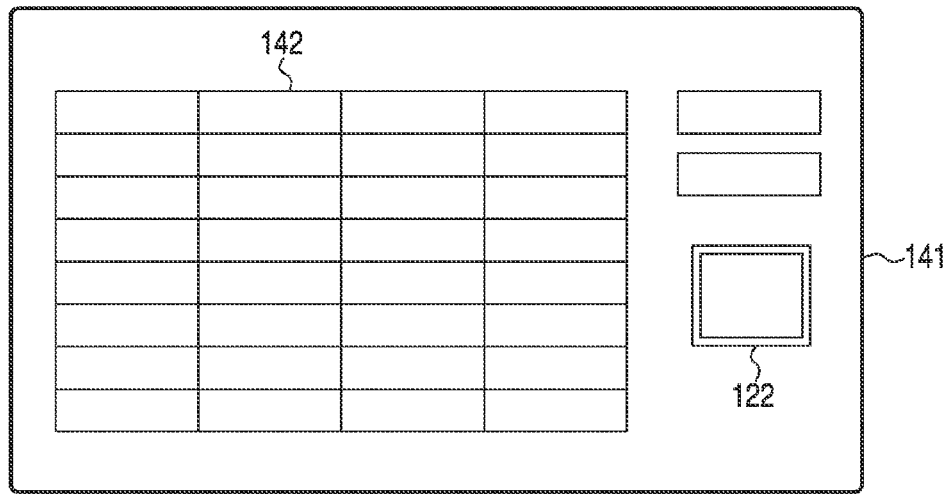

FIG. 13 is a diagram of a screen 141 having a smart button 122 and one or more tables 142 that may relate to smart button 122.

Figure 14:
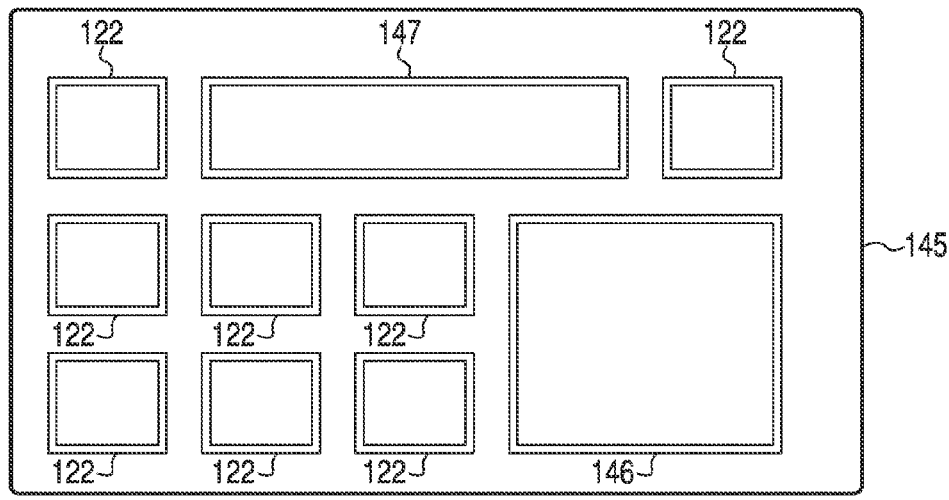

FIG. 14 is a diagram of a screen 145 revealing a dashboard. The dashboard in this instance may a default smart button screen. There may be standard buttons 122, and special buttons 146 and 147.

Figure 15:
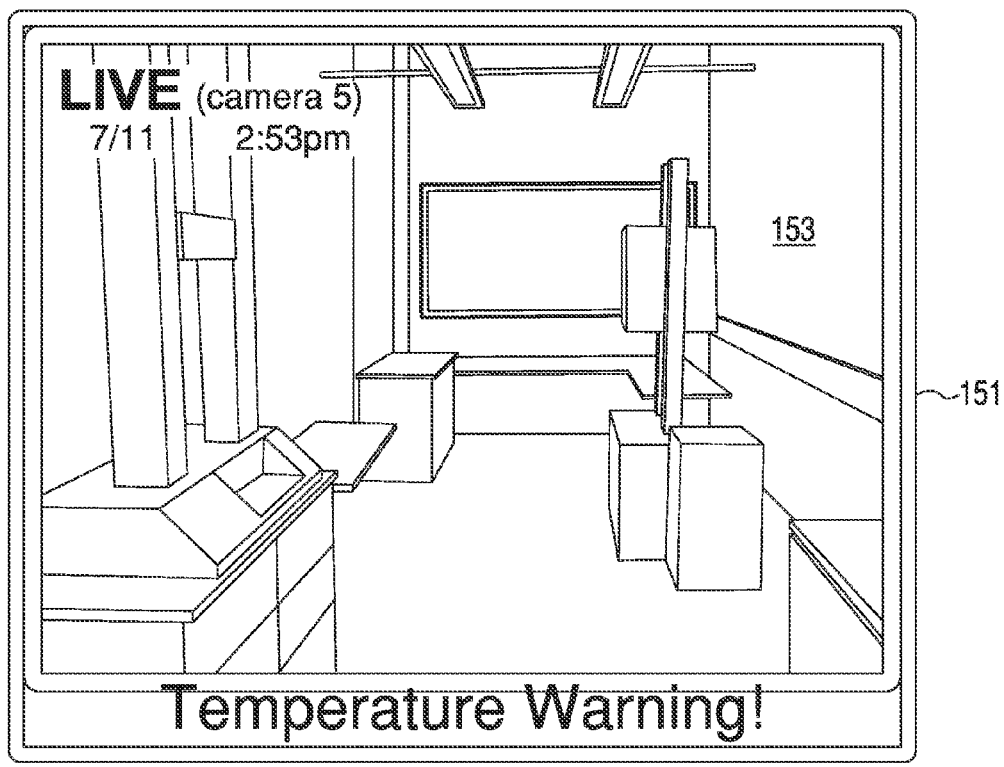
FIG. 15 is a diagram of a screen that may pop-up on a dashboard or be a smart button type of screen.

FIG. 15 may be a screen 151 that can pop-up on a dashboard or be a smart button type of screen. The image in screen 151 may reveal a space 153 from a surveillance camera where a temperature sensor in space 153 has indicated a higher than normal temperature revealing a possible fire. The camera image in screen 151 could show a fire in progress.

Figure 16:
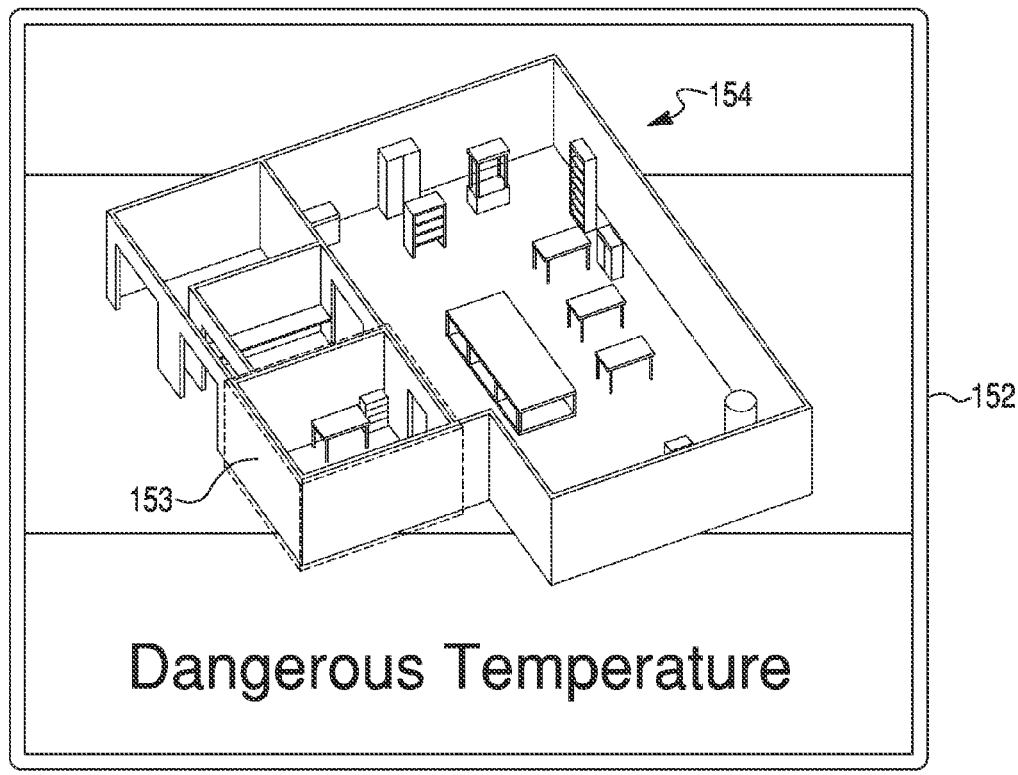
FIG. 16 is a diagram of a screen showing an overall structure of a building in which a space can be located for quick access.

FIG. 16 is a diagram of a screen 152 showing an overall structure of a building 154 in which space 153 can be located for quick access with extinguishing equipment for quickly bring a possible fire under control.

FIG. 17 is a diagram of a screen revealing space 153, a bacteria laboratory, with a temperature of 92 degrees F., which could mean that, rather than a fire ensuing, some bacterial specimens might be in danger of deterioration. Screen 153 may also indicate that an auto-adjustment of the space temperature to 53 degrees F. is going to occur in 30 seconds.

Figure 18:
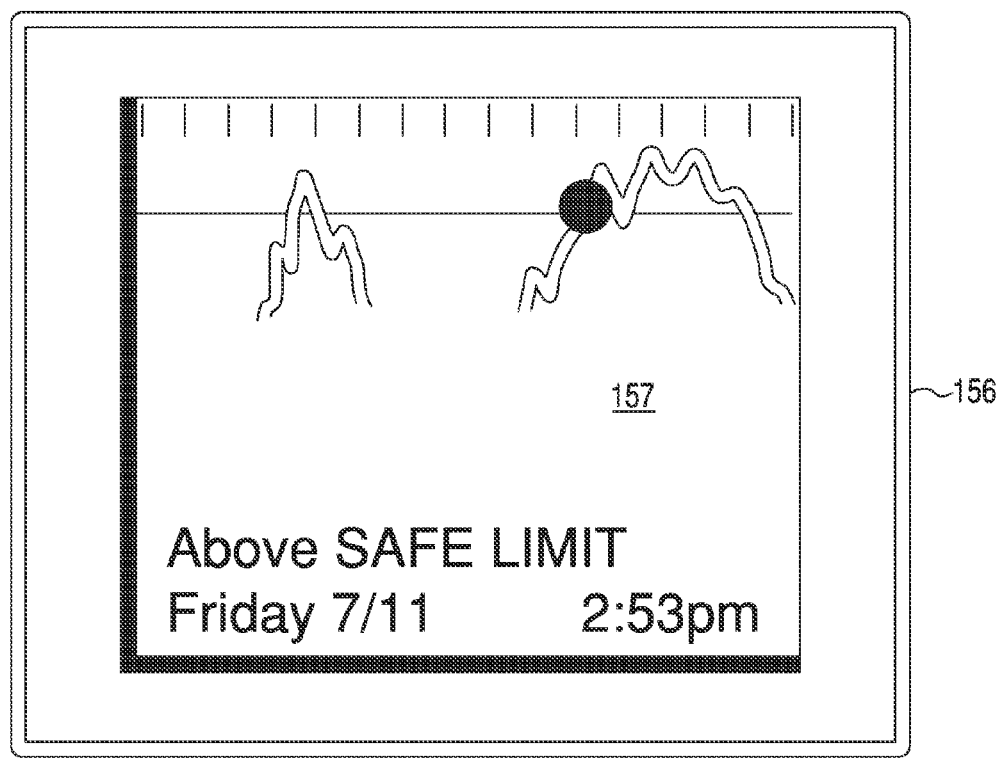
FIG. 18 is a diagram of a screen that indicates a charting of temperature in the space.

FIG. 18 is a diagram of a screen 156 that indicates a charting 157 of temperature in the lab and shows one the temperature exceeding a safe limit.

Figure 19:
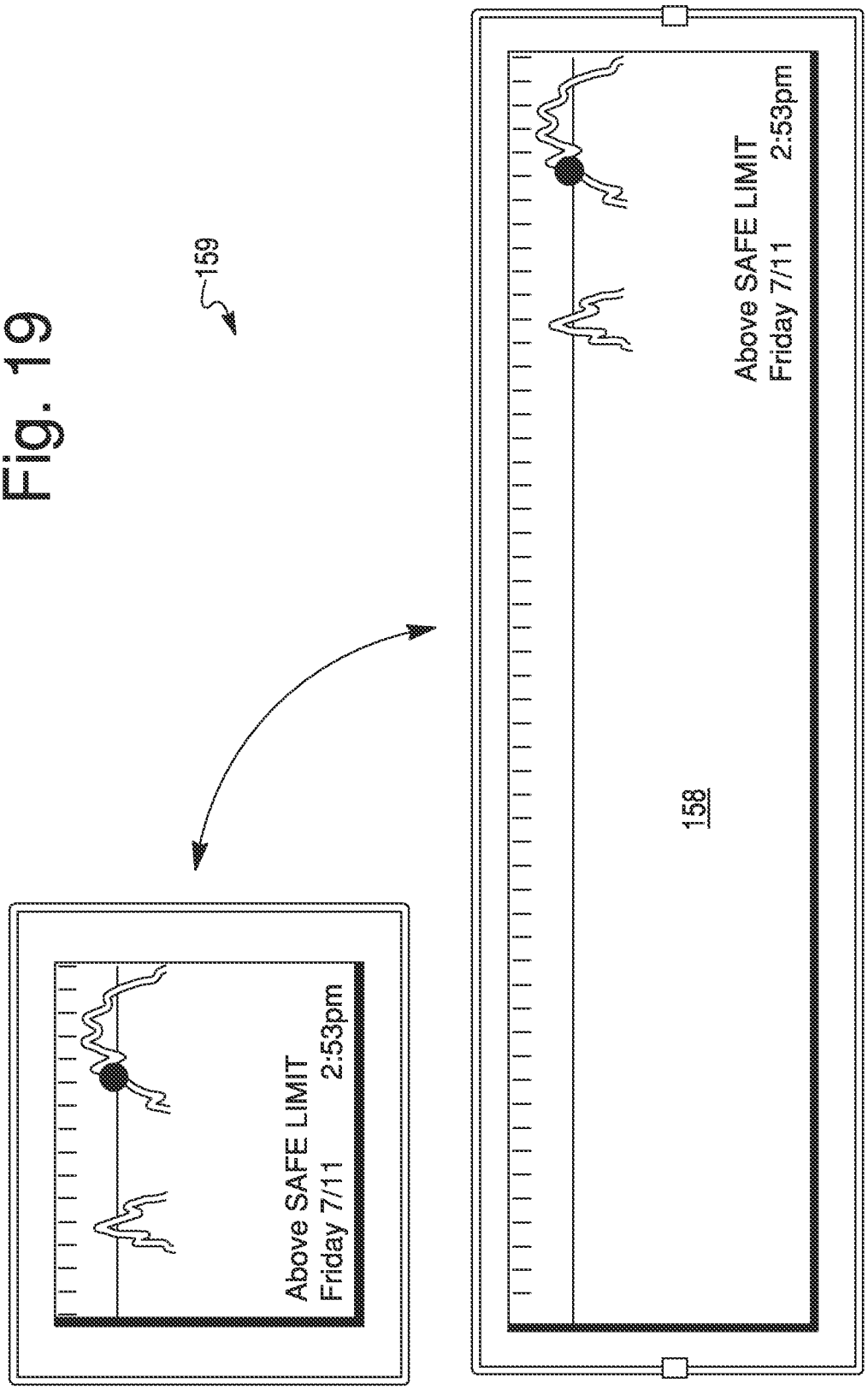
FIG. 19 is a diagram of screen with chart 157 that may be changed in size or position to reveal more information.

FIG. 19 is a diagram of screen 159 with chart 157 that may be changed in size to reveal more information, such as a previous temperature history, or to improve readability of chart 157. Positions of chart 157 may be also changed.

Figure 20:
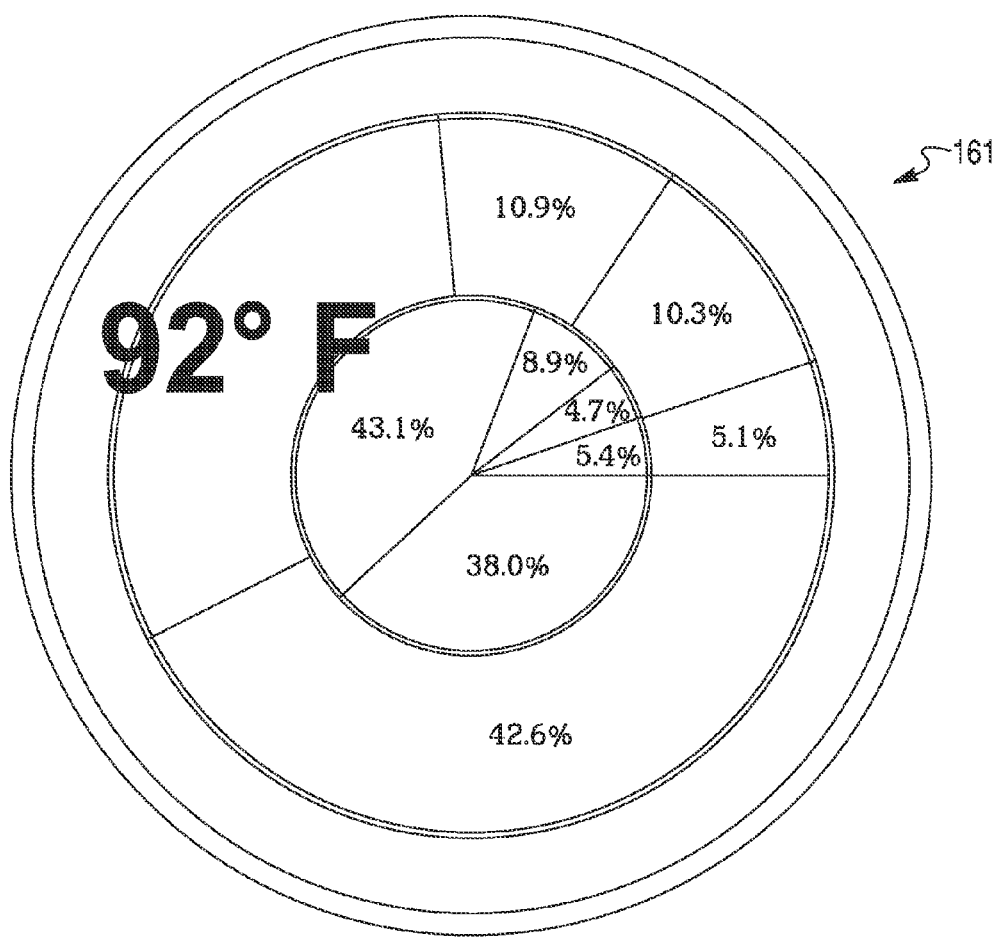
FIG. 20 is a diagram of a screen that may reveal a percentage of time that the temperature was a certain magnitude, greater or less, relative to time showing.

FIG. 20 is a diagram of a screen 161 that may reveal a percentage of time that the temperature was 92 degrees or greater relative to other temperatures at another time showing whether the temperature was increasing or decreasing for the amount of observed times.

FIG. 21 is a diagram of screen 162 indicating activity of the temperature monitoring system relative to the lab of concern and personnel notifications and actions.

To recap, a modular information system may incorporate a processor, a memory connected to the processor, a display connected to the processor, and a screen, available for viewing on the display, having a first portion and a second portion. The first portion may show a schematic of a heating, ventilation and air conditioning (HVAC) system incorporating one or more components. The second portion may show one or more control and information modules for the HVAC system. The schematic of the HVAC system may reveal one or more data modules associated with the one or more components, respectively, of the HVAC system in the first portion.

A keyboard/mouse may be connected to the processor and operate along with the display as at least a part of a user interface. The processor may also be connected to the HVAC and to an interface for other connections.

The schematic of the HVAC system may incorporate a perspective view. The perspective view may show views of the one or more components.

The one or more control and information modules may incorporate one or more items from a group consisting of set points, control modes, high limits, low limits, high heating signals, high cooling signals, and mode selections for the HVAC system.

The one or more data modules may incorporate one or more items selected from a group consisting of state of return fan, return air temperature, state of supply fan, amount of supply fan speed, amount of supply fan current, low temperature status, supply air temperature, static air pressure, outside air temperature, mixed air temperature, heating valve amount of opening, cooling valve amount of opening, economizer position, economizer lockout temperature, high temperature status, amount of supply air valve opening, amount of mixed air valve opening, amount of outside air valve opening, amount of return air valve opening, and amount of exhaust air valve opening.

The second portion may show relationships having one or more items selected from a group consisting of boiler and chiller systems, application profiles for a standard variable air volume (VAV) system, office scheduler, conference scheduler, interior zones, parameter zones, zones covered by alarms, and alarm records for present and past times.

The view of the one or more components may incorporate an animation of the one or more components. The animation of the one or more components may incorporate one or more items selected from a group consisting of movement and direction of air flows, air temperatures, rotation of fans, changing colors showing heating and cooling coil activity, dynamic updating indications of information at the data modules, and position changing of dampers.

The control and information modules may be deliverable as consumable like of information pertaining to the one or more components. The modules may be grouped in accordance with category, technology or function. The modules may be situated in and selectable from a carousel.

An approach for displaying modular information may incorporate providing a processor, providing a memory connected to the processor, and providing a display connected to the processor. A screen, having a first portion and a second portion, may be available for viewing on the display. The first portion may show a schematic of a heating, ventilation and air conditioning (HVAC) system incorporating one or more components. The second portion may show one or more control and information modules for the HVAC system. The schematic of the HVAC system may reveal one or more data modules associated with the one or more components, respectively, of the HVAC system in the first portion.

The second portion may pertain to information modules about relationships among one or more items selected from a group consisting of boiler and chiller systems, application profiles for a standard VAV, office scheduler, conference scheduler, interior zones, parameter zones, zones covered by alarms, and alarm records for present and past times.

The schematic of the HVAC system may incorporate a perspective view of the one or more components. The view of the one or more components may incorporate an animation of the one or more components. The animation of the one or more components may reveal one or more items selected from a group consisting of movement and direction of air flows, rotation of fans, changes of temperatures of air and heating and cooling coils, dynamic updating of information at the data modules, and position changing of dampers.

The control and information modules may be deliverable as groups of data and information pertaining to the one or more components. The modules may be added or removed piece by piece into a group in accordance with category, technology or function of data and information.

The control and information modules may pertain to the one or more components. The modules may be situated in and selectable from a carousel.

A mechanism for modular information may incorporate a processor, a memory connected to the processor, a display connected to the processor, and a screen, available for viewing on the display, having a portion. The portion may show a schematic of a heating, ventilation and air conditioning (HVAC) system incorporating one or more components. A cursor may be moved around on the screen to a component of the one or more components to get a card to appear on the screen revealing information about the component.

The screen may further have a second portion. The second portion may show one or more control modules for the HVAC system. The schematic of the HVAC system may incorporate a perspective view of the one or more components.

The one or more control modules may incorporate one or more items from a group consisting of set points, control modes, high limits, low limits, high heating signals, high cooling signals, and mode selections for the HVAC system.

A schematic of the HVAC system may reveal one or more data modules associated with one or more components, respectively, of the HVAC system in the first portion. The one or more data modules may incorporate one or more items selected from a group consisting of state of return fan, return air temperature, state of supply fan, amount of supply fan speed, amount of supply fan current, low temperature status, supply air temperature, static air pressure, outside air temperature, mixed air temperature, heating valve amount of opening, cooling valve amount of opening, economizer position, economizer lockout temperature, high temperature status, amount of supply air valve opening, amount of mixed air valve opening, amount of outside air valve opening, amount of return air valve opening, and amount of exhaust air valve opening.

The view of the one or more components may incorporate an animation of the one or more components. The animation of the one or more components may incorporate one or more items from a group consisting of movement and direction of air flows, rotation of fans, heating and cooling coil activity, dynamic updating information at the data modules, and position changing of dampers.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A modular information system comprising:
    a processor;
    a memory connected to the processor and storing an application for a representation and report of a heating, ventilation and air conditioning (HVAC) system; and
    a display connected to the processor; and
    wherein:
    the processor comprises an engine for providing a screen, available for viewing the application on the display, the view of the application having a first portion and a second portion;
    the first portion shows:
        a schematic of the HVAC system incorporating representations of one or more components of the HVAC system distributed throughout a schematic of a building; and
        data cards that appear proximate to each corresponding component representation when each corresponding component representation is selected and disappears when each corresponding component representation is deselected; and
        wherein the one or more components of the HVAC system are communicatively connected with the processor, the one or more components including at least a component configured to heat air or a component configured to cool air; and
    the second portion shows one or more control modules and information modules for the HVAC system, wherein the one or more control modules and information modules are scrollable and capable of moving off the screen and control modules and information modules are insert able and removable to and from the one or more control modules and information modules; and
    wherein the processor is configured to:

access the application from the memory and associate streaming component data from each of the one or more components to a corresponding component representation;

group the streaming component data into the data cards according to each data cards corresponding component representation;

group the streaming component data into the one or more control modules and information modules according to a data type; and update the data cards and the one or more control modules and information modules in real-time using the associated streaming component data.

2. The system of claim 1, wherein:

inserting and removing the control modules and information modules to and from the one or more control modules and information modules comprises a drop-in application system; and when a drop-in is added to the one or more control modules and information modules, the drop-in is viewable in a module carousel.

3. The system of claim 1, wherein:

the schematic of the HVAC system comprises a perspective view; and the perspective view is of the one or more components.

4. The system of claim 1, wherein the one or more control modules and information modules comprise one or more items from a group consisting of set points, control modes, high limits, low limits, high heating signals, high cooling signals, and mode selections for the HVAC system.

5. The system of claim 1, wherein the one or more control modules and information modules comprise one or more items selected from a group consisting of a state of return fan, return air temperature, state of supply fan, amount of supply fan speed, amount of supply fan current, low temperature status, supply air temperature, static air pressure, outside air temperature, mixed air temperature, heating valve amount of opening, cooling valve amount of opening, economizer position, economizer lockout temperature, high temperature status, amount of supply air valve opening, amount of mixed air valve opening, amount of outside air valve opening, amount of return air valve opening, and amount of exhaust air valve opening.

6. The system of claim 5, wherein the one or more control modules and information modules further comprise one or more items selected from a group consisting of boiler and chiller systems, application profiles for a standard variable air volume system, office scheduler, conference scheduler, interior zones, parameter zones, zones covered by alarms, and alarm records for present and past times.

7. The system of claim 3, wherein the view of the one or more components comprises an animation of the one or more components.

8. The system of claim 7, wherein the animation of the one or more components comprises one or more items selected from a group consisting of movement and direction of air flows, air temperatures, rotation of fans, changing colors showing heating and cooling coil activity, dynamic updating indications of information at the data modules, and position changing of dampers.

9. The system of claim 1, wherein the control modules and information modules are deliverable as a consumable pertaining to the one or more components.

10. The system of claim 9, wherein the control modules and information modules are grouped in accordance with category, technology or function.

11. The system of claim 9, wherein the control modules and information modules are situated in and selectable from a carousel.

12. A method for displaying modular information comprising:

providing a processor;

providing a memory storing an application for a representation and report of a heating, ventilation and air conditioning (HVAC) system, the memory connected to the processor; and providing a display connected to the processor; and wherein:

the processor comprises an engine for providing a screen, available for viewing the application on the display, having a first portion and a second portion;

the first portion shows:

a schematic of the HVAC system incorporating representations of one or more components of the HVAC system distributed throughout a schematic of a building;

data cards that appear proximate to each corresponding component representation of the representations of the one or more components when each corresponding component representation is selected and disappears when each corresponding component representation is deselected; and wherein the one or more components of the HVAC system are for providing heated, cooled, recirculated, or fresh air to a building and the one or more components are communicatively connected with the processor;

the second portion shows one or more information modules associated with the one or more components of the HVAC system, wherein the one or more information modules are scrollable and capable of moving off the screen and information modules are insert able and removable to and from the one or more information modules; and wherein the processor is configured to:

access the application from the memory and associate streaming component data from each of the one or more components to a corresponding component representation from the representations of the one or more components;

group the streaming component data into the data cards according to each data cards corresponding component representation;

group the streaming component data into the one or more information modules according to a data type; and update the data cards and the one or more information modules in real-time using the associated streaming component data.

13. The method of claim 12, wherein:

inserting and removing the information modules to and from the one or more information modules comprises a drop-in application system; and when a drop-in is added to the one or more information modules, the drop-in is viewable in a module carousel.

14. The method of claim 12, wherein the second portion further shows information modules indicating relationships of one or more items selected from a group consisting of boiler and chiller systems, application profiles for a standard VAV, office scheduler, conference scheduler, interior zones, parameter zones, zones covered by alarms, and alarm records for present and past times.

15. The method of claim 12, wherein
the schematic of the HVAC system comprises a view of the one or more components;
the view of the one or more components comprises an animation of the one or more components; and
the animation of the one or more components reveals one or more items selected from a group consisting of movement and direction of air flows, rotation of fans, changes of temperatures of air and heating and cooling coils, dynamic updating of information at the data modules, and position changing of dampers.

16. The method of claim 14, wherein:
the information modules are deliverable as consumable information pertaining to the one or more components; and
the information modules can be inserted or removed piece by piece into a group in accordance with category, technology or function of data and information.

17. The method of claim 12, wherein:
the information modules pertain to the one or more components; and
the information modules are situated in and selectable from a carousel.

\* \* \* \* \*